(12) United States Patent
Ebata et al.

(10) Patent No.: US 7,461,185 B2
(45) Date of Patent: *Dec. 2, 2008

(54) STREAMING DATA TRANSFER SYSTEM AND REPEATER THEREFOR

(75) Inventors: Koichi Ebata, Tokyo (JP); Kenji Takeda, Tokyo (JP)

(73) Assignee: NEC Corporation (JP)

( * ) Notice: Subject to any disclaimer, the term of this patent is extended or adjusted under 35 U.S.C. 154(b) by 266 days.

This patent is subject to a terminal disclaimer.

(21) Appl. No.: 11/314,315

(22) Filed: Dec. 22, 2005

(65) Prior Publication Data

US 2006/0106961 A1 May 18, 2006

Related U.S. Application Data

(63) Continuation of application No. 09/940,305, filed on Aug. 27, 2001, now Pat. No. 7,054,961.

(30) Foreign Application Priority Data

Aug. 28, 2000 (JP) ............... 2000-258083

(51) Int. Cl.
*G06F 13/00* (2006.01)
*G06F 3/00* (2006.01)

(52) U.S. Cl. ............. 710/52; 710/60; 709/233; 709/235; 709/238; 709/232

(58) Field of Classification Search ............. 710/52, 710/60; 709/233, 235, 232, 238
See application file for complete search history.

(56) References Cited

U.S. PATENT DOCUMENTS

| | | | |
|---|---|---|---|
| 5,970,048 A | 10/1999 | Pajuvirta et al. | |
| 6,006,270 A | 12/1999 | Kobunaya | |
| 6,026,095 A | 2/2000 | Sherer et al. | |
| 6,115,749 A | 9/2000 | Golestani et al. | |
| 6,141,692 A | 10/2000 | Loewenstein et al. | |
| 6,170,022 B1 | 1/2001 | Linville et al. | |
| 6,622,172 B1 * | 9/2003 | Tam | 709/232 |

(Continued)

FOREIGN PATENT DOCUMENTS

JP    4-188929    7/1992

(Continued)

OTHER PUBLICATIONS

Hui, J.Y., et al., "Client-Server Synchronization and Buffering for Variable Rate Multimedia Retrievals," IEEE Inc., vol. 14, No. 1, 1996.

(Continued)

*Primary Examiner*—Tammara R Peyton
(74) *Attorney, Agent, or Firm*—Dickstein, Shaprio, LLP.

(57) ABSTRACT

A data transfer system allowing high-quality transfer of streaming data through a network having a relatively large delay variation in data delivery is disclosed. When transferring streaming data in packets from a server computer to a client computer through a repeater provided in the network, the repeater buffers a streaming packet for a set time period before forwarding it to the client computer. The set time period is determined so that a receiving time interval of packets at the client computer is substantially equal to a sending time interval of packets at the server computer.

9 Claims, 5 Drawing Sheets

U.S. PATENT DOCUMENTS

2001/0032269 A1    10/2001    Wilson

FOREIGN PATENT DOCUMENTS

JP      05176000      4/1993

WO      WO-9522233      8/1995

OTHER PUBLICATIONS

Su, T-C, et al., "Buffered Multicast Routing for Video-on-Demand Systems," ICC '99. IEEE International Conference on Communications, Conf. Rec., Vancouver, CA, 1999, IEEE Int'l. Conf. on Comm., New York, vol. 2, 1999.

* cited by examiner

SERVER

CLIENT

FIG. 4

| V | P | X | CC | M | PT | SEQUENCE Num. |
|---|---|---|----|----|----|---------------|
| \multicolumn{7}{c}{TIME STAMP} |
| \multicolumn{7}{c}{SYNC. SOURCE (SSRC) IDENTIFIER} |
| \multicolumn{7}{c}{CONTRIBUTION SOURCE (CSRC) IDENTIFIER} |

V : VERSION  
P : PADDING  
X : EXTENSION BIT

CC : CSRC COUNT  
PT : PAYLOAD TYPE  
X : EXTENSION BIT

FIG. 5

FLOW REGISTRATION TABLE

| ADDRESS | | PORT Num. | | SEQUENCE Num. | TIME STAMP | NEXT SENDING TIME |
|---|---|---|---|---|---|---|
| SOURCE | DESTINATION | SOURCE | DESTINATION | | | |
| | | | | | | |
| | | | | | | |

STREAMING DATA TRANSFER SYSTEM AND REPEATER THEREFOR

CROSS-REFERENCE TO RELATED APPLICATIONS

This application is a Continuation of U.S. application Ser. No. 09/940,305, filed Aug. 27, 2001 now U.S. Pat. No. 7,054,961.

BACKGROUND OF THE INVENTION

1. Field of the Invention

The present invention relates to techniques of data transfer between two computers via a network, and in particular to a system and method of transferring streaming data from one computer to another and a repeater for use in such a data transfer system.

2. Description of the Related Art

There has been a streaming technique of distributing a real-time content such as audio or video, allowing a client computer to play the content almost concurrent with receipt of the content from a server computer. Since the client computer can play the content without downloading all the content data, a user can obtain fast response and it is effective especially in the case of small memory capacity in the client side.

In real-time content transmission in Internet, the following protocol may be employed: RTSP (Real-time streaming protocol, RFC 2326) and RTP (Real-time transport protocol RFC 1889). RTSP is a streaming control protocol allowing play, stop, and setup. RTP is a transfer protocol for real-time packet transfer. As application software for streaming transmission, RealSystem™ of RealNetworks and Windows Media Player™ of Microsoft Corporation are available.

In the case of a network such as Internet that does not sufficiently assure assignment of bandwidth or stability of delay, the quality of streaming data transmission is significantly affected by variations in delay time of packet. Since delays in packet delivery vary during transmission, it is necessary to adjust the content play timing at the client side even if the server has sent packets of the content at the same timing as played at the client side.

In order to compensate for momentary delays in packet delivery caused by delay variations to achieve uninterrupted sound or motion, the client side buffers received streaming packets before it starts playing. Such a buffering method is in general employed (see Japanese Patent Application Unexamined Publication No. 4-188929).

However, in the case of Internet access via mobile environment, a radio link causes a wider range of delay variation in packet delivery compared with fixed environment because the radio link itself exhibits a relatively long delay as well as loss of packet. Accordingly, there are cases where the above conventional delay variation control at the client side cannot compensate for delay variations in packet delivery. Since an amount of delay variation that can be compensated for is dependent on the capacity of a buffer, a wider range of delay variation cannot be compensated for without a larger capacity of a buffer. In mobile environment from which a high performance as in fixed environment cannot be expected, it is difficult to ensure a sufficient capacity of a buffer in a mobile device.

It is also considered that delay variation in packet delivery is controlled at some midpoint of a route from the server to the client to improve the quality of streaming data. However, since Internet traffic includes not only streaming data but ordinary data not requiring real-time transmission, it is necessary to discriminate between streaming data and ordinary data, resulting in complicated packet control.

SUMMARY OF THE INVENTION

An object of the present invention is to provide a data transfer system, a data transfer method, and a repeater for use therein, allowing transfer of streaming data through a network without reducing the quality of played content at a receiving side having a relatively small capacity of a buffer, even if the network exhibits a relatively large delay variation in data delivery.

According to the present invention, a system for transferring streaming data in packets from a first computer to a second computer through a network, includes a repeater provided in the network, the repeater comprising a buffering controller for buffering a received packet for a set time period before forwarding it so that a receiving time interval of packets at the second computer is substantially equal to a sending time interval of packets at the first computer.

The set time period is preferably determined depending on a reception condition of the second computer, wherein the second computer notifies the repeater of the reception condition.

The second computer preferably has a buffering function of buffering received packets to absorb delay variations of the received packets.

The reception condition may include information of an available buffering capacity in the second computer.

According to an embodiment, a repeater through which streaming data in packets is transferred from a first computer to a second computer, includes: a flow registration table for storing time information of packets for each streaming flow; a packet memory for storing streaming packets for each streaming flow; a packet analyzer for analyzing a received packet to discriminate a packet related to a streaming flow by searching the flow registration table for address and port number information of the received packet and storing flow information identifying the streaming flow into the flow registration table; a header analyzer for analyzing a header of the packet related to the streaming flow to produce time information of a streaming packet of the streaming flow and store the streaming packet into the packet memory; a packet manager for storing the time information of the streaming packet into the flow registration table and determining the set time period from the time information to produce sending time of the streaming packet; and a packet sending controller for sending the streaming packet to the second computer when the sending time has come under control of the packet manager.

The packet analyzer preferably forwards packets other than a packet related to a streaming flow to the second computer.

According to another aspect of the present invention, a method for transferring streaming data in packets from a first computer to a second computer through a network, includes the steps of: the first computer sending a streaming packet to a repeater; the repeater buffering the streaming packet for a set time period before forwarding it to the second computer so that a receiving time interval of packets at the second computer is substantially equal to a sending time interval of packets at the first computer; and the second computer buffering the streaming packet received from the repeater before reproducing it.

As described above, according to the present invention, even when a delay variation of streaming packets is unacceptably increased at a receiving side, the repeater buffers a streaming packet for a set time period before forwarding it to suppress such a great delay variation, resulting in improved quality of application of the receiving side. Since delay variation in packet delivery is suppressed, high-quality play of the delivered content at the receiving side can be obtained even if the receiving side has a relatively small capacity of a buffer provided therein.

When the receiving side sends a reception condition thereof back to the sending side, the repeater can adjust the packet buffering time depending on the reception condition of the receiving side. Accordingly, an absolute delay over the network can be minimized, resulting in reduced capacity of a buffer at the receiving side.

Further, when the repeater discriminates a packet related to a streaming flow, only streaming flow related packets are buffered at the repeater and other packets are directly transferred. Accordingly, the data transfer system and the repeater can be used in environment transferring various kinds of packets, for example, the Internet.

BRIEF DESCRIPTION OF THE DRAWINGS

FIG. 4 is a diagram showing a header format of a RTP packet used in the present embodiment; and FIG. 5 is a diagram showing an example of a flow registration table in the repeater.

DESCRIPTION OF THE PREFERRED EMBODIMENT

Figure 1:
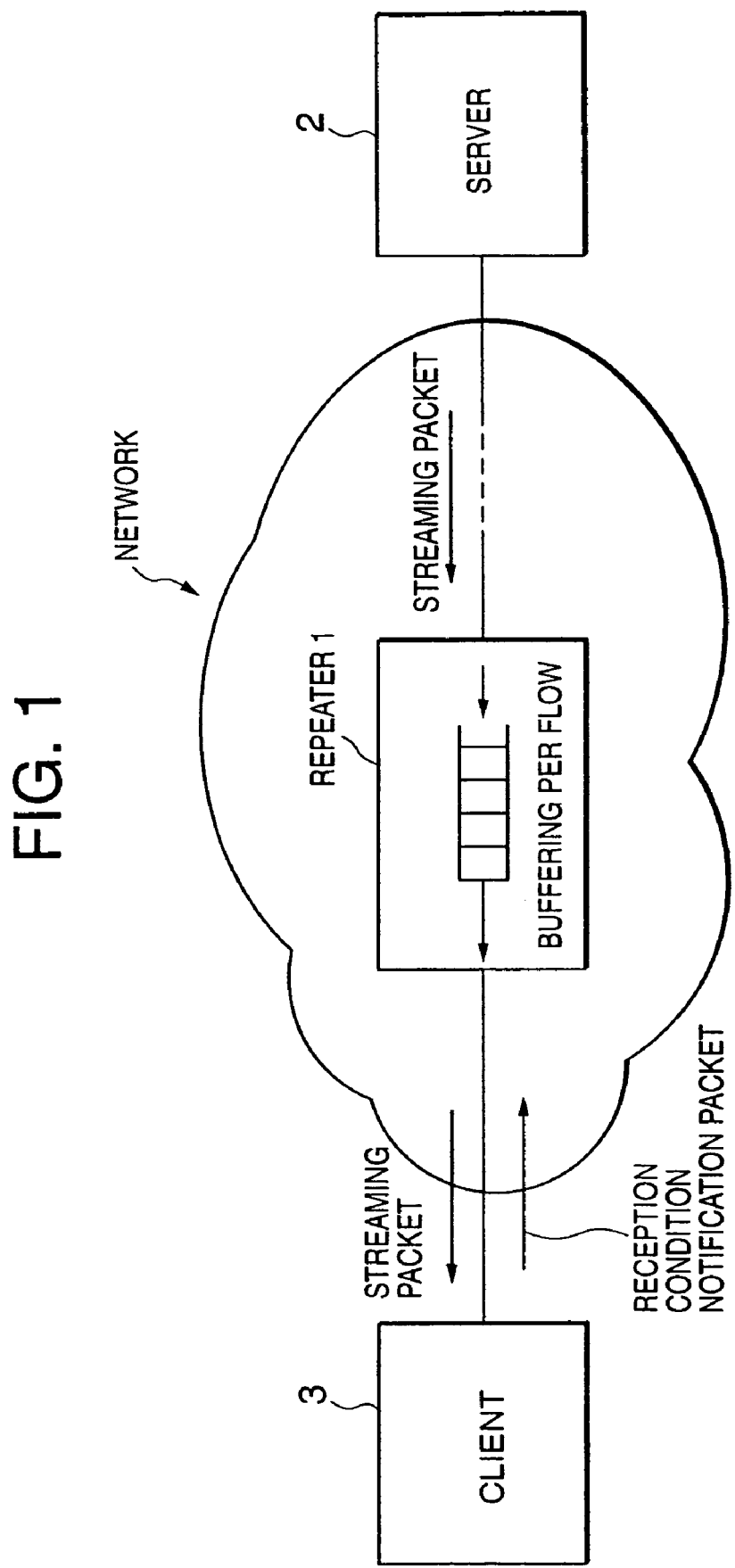
FIG. 1 is a diagram showing an outline of a data transfer system according to the present invention.

As shown in FIG. 1, it is assumed for simplicity that a network including a repeater 1 connects a server device 2 and a client device 3.

At the request of the client device 3, the server device 2 starts sending streaming packets of a requested content to the client device 3 through the repeater 1 in the network. The network is typically the Internet. A streaming packet flowing from the server device 2 downstream to the client device 3 is buffered in the repeater 1 so as to adjust sending timing of the received streaming packet. Although only one flow of streaming packets for the content is shown in FIG. 1 for simplicity, the repeater 1 according to the present invention is allowed to individually buffer a plurality of flows. The details of the repeater 1 will be described later.

The streaming packets buffered in the repeater 1 are sent to the client device 3 in adjusted timing. The client device 3 buffers streaming packet before it starts reproducing it to absorb delay variation in packet transmission.

In this manner, the requested real-time content is played by a predetermined application in the client device 3 without interrupted sound or motion. Since the repeater 1 temporarily buffers streaming packets received from the server device 2, high-quality play of the delivered content at the client device 3 can be obtained even if the client device 3 has a relatively small capacity of a buffer provided therein.

In addition, the client device 3 may send a reception condition notification packet back to the server side. When receiving the notification packet, the repeater 1 adjusts the packet buffering time depending on the reception condition of the client device 3.

Repeater

Figure 2:
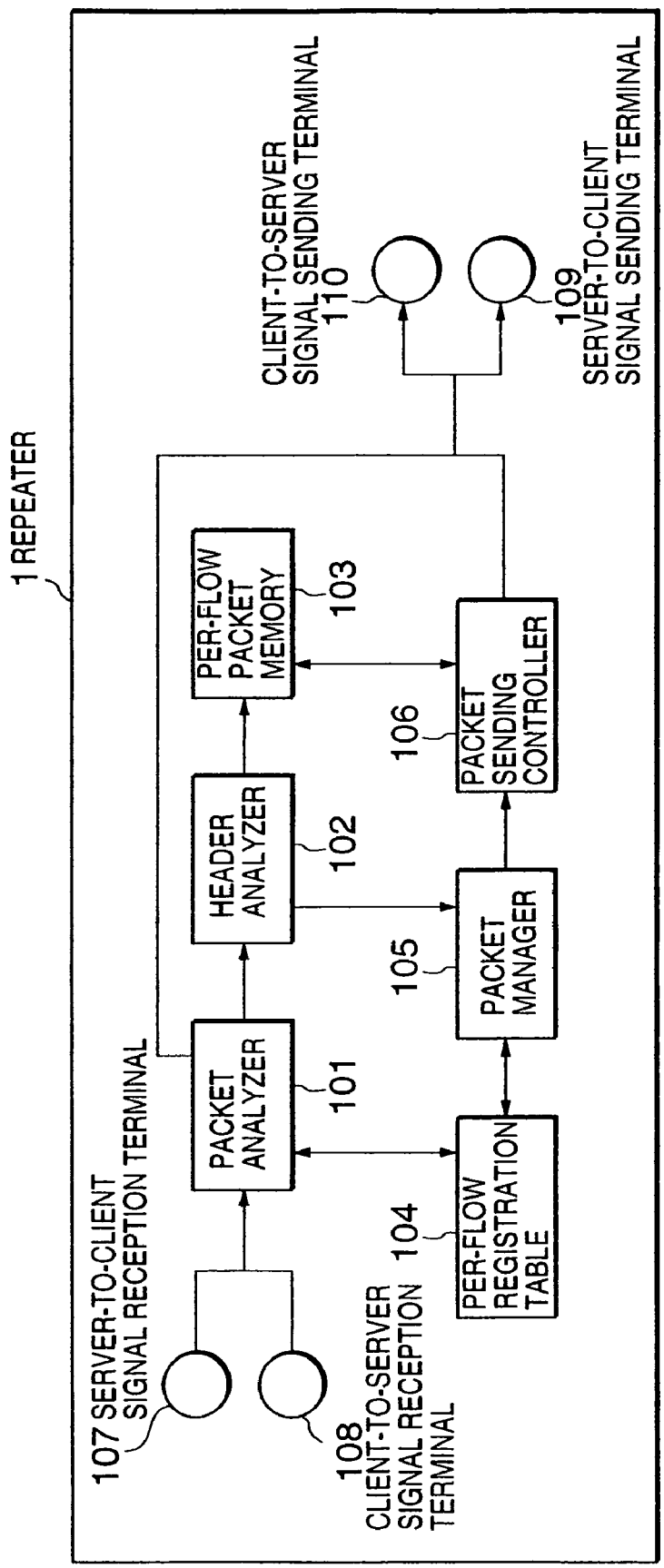
FIG. 2 is a block diagram showing an internal circuit of a repeater according to an embodiment of the present invention.

Referring to FIG. 2, the repeater 1 is provided with a packet analyzer 101, a header analyzer 102, a packet memory 103, a flow registration table 104, a packet manager, a packet sending controller, a server-to-client (downstream) signal reception terminal 107, a client-to-server (upstream) signal reception terminal 108, a server-to-client signal sending terminal 109 and a client-to-server signal sending terminal 110.

The packet analyzer 101, when receiving a packet from the reception terminal 107 or 108, determines whether the received packet is a streaming packet or a feedback information packet related to a flow registered in the flow registration table 104. When it is a streaming packet or a feedback information packet, the packet analyzer 101 transfers it to the header analyzer 102. When it is neither a streaming packet nor a feedback information packet, the packet analyzer 101 forwards it to a selected one of the server-to-client sending terminal 109 and the client-to-server sending terminal 110 depending on its destination address. Further, as described in detail later, the packet analyzer 101 registers the address and port number of a streaming flow in the flow registration table 104 depending on whether the received packet uses a port number that is used by streaming transmission control protocol or is conventionally used by a streaming transmission application.

The header analyzer 102 analyzes the header of the received streaming packet and notifies the packet manager 105 of information of the received packet such as a sequential number and a time stamp indicating a time instant of the server device 2 sending it.

The packet memory 103 buffers streaming packets input from the header analyzer 102 and queues streaming packets for each flow until a sending instruction for a flow has been received from the packet sending controller 106. A flow is defined as a set of packets related to a certain content transferring between a server device 2 and a client device 3.

The flow registration table 104 contains information related to each streaming flow in table form as shown in FIG. 4, which will be described in detail later.

The packet manager 105 inputs the information of the received streaming packet from the header analyzer 102 and registers it for each flow into the flow registration table 104. The packet manager 105 also outputs a packet sending instruction for each flow to the packet sending controller 106 when the time to send has come.

The packet sending controller 106, when receiving a packet sending instruction for a certain flow from the packet manager 105, reads a head packet of a queue for the flow from the packet memory 103 and forwards it to the server-to-client signal sending terminal 109.

A packet sent from the server device 2 toward the client device 3 is received at the server-to-client signal reception terminal 107 and is forwarded to the packet analyzer 101. A packet sent from the client device 3 toward the server device 2 is received at the client-to-server signal reception terminal 108 and is forwarded to the packet analyzer 101. A packet output from one of the packet analyzer 101 and the packet sending controller 106 is sent from the server-to-client signal sending terminal 109 toward the client device 3. A packet output from the packet analyzer 101 is sent from the client-to-server signal sending terminal 110 toward the server device 2.

Server

Figure 3A:
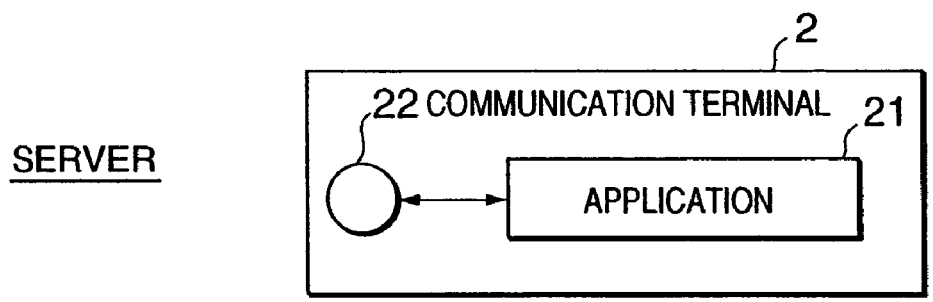
FIG. 3A is a block diagram showing an internal circuit of a server computer in the data transfer system of FIG. 1.

Referring to FIG. 3A, the server device 2 is provided with an application 21 and a communication terminal 22 through which packets are sent and received to and from the client device 3. The application 21 allowing streaming packets to be sent to a client device corresponds to an application for processing streaming packets to play installed in the client device 3.

Client

Figure 3B:
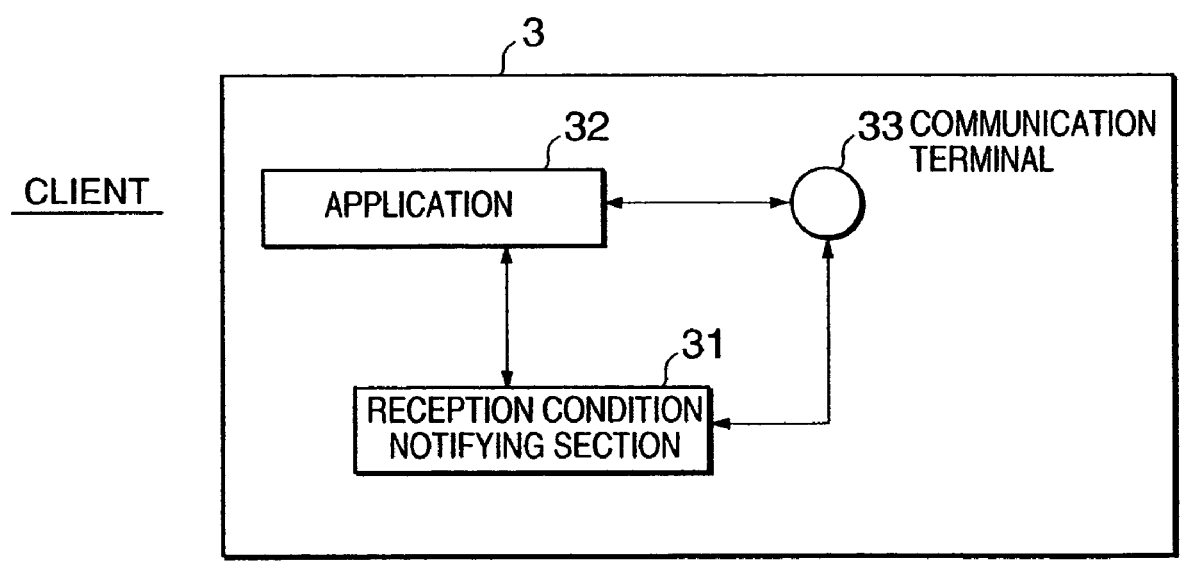
FIG. 3B is a block diagram showing an internal circuit of a client computer in the data transfer system of FIG. 1.

Referring to FIG. 3B, the client device 3 is provided with a reception condition notifying section 31, an application 32, and a communication terminal 33. The application 32 corresponds to the application 21 of the server device 2 and is designed to process streaming packets to play sound and video of the requested content. As described before, the application 32 is provided with a buffer for absorbing delay variations in packet transmission.

The reception condition notifying section 31 calculates a difference between packet arrival timing and play timing of streaming packets processed by the application 32. Based on the calculated timing difference, the reception condition notifying section 31 produces a reception condition indicating the capacity of the buffer provided in the application 32 and the amount of available capacity thereof, and sends a reception condition notification packet carrying the reception condition as feedback information to the repeater 1 through the communication terminal 33.

Operation

Assuming that the server device 2 sends streaming packets to the client device 3 through the repeater 1 in the network, an operation of the repeater 1 will be described hereinafter.

In the above-described repeater 1, when a packet is received at the server-to-client signal reception terminal 107, the received packet is forwarded to the packet analyzer 101.

When receiving the packet, the packet analyzer 101 searches the flow registration table 104 for the destination address and port number (flow identifying information) of the received packet to determine whether the received packet is a streaming packet of a flow registered in the flow registration table 104.

Further, in order to register the address and port number of a streaming flow in the flow registration table 104, the packet analyzer 101 determines whether the received packet uses a port number that is used by the streaming transmission control protocol (e.g. RTSP, port number 554) or is conventionally used by a streaming transmission application (e.g. port number 6970 in a streaming transmission system RealSystem™ of RealNetworks).

When a packet conforming to the streaming transmission control protocol has been received, the packet analyzer 101 analyzes the contents of the received packet to obtain information of address and port number used in streaming transmission. When a packet using a port number for conventional streaming transmission has been received, the packet analyzer 101 obtains information of address and port number of the received packet. In this manner, the packet analyzer 101 registers a pair of address and port number for each of source and destination into the flow registration table 104 (see FIG. 5). This method allows streaming data to be extracted from received various packets in the network such as an IP network transferring various kinds of packets.

The packet analyzer 101 searches the flow registration table 104 for the destination address and port number of the received packet and, when a match is found (that is, when it is a streaming packet), the packet analyzer 101 transfers it to the header analyzer 102. When it is not a streaming packet, the packet analyzer 101 forwards it to a selected one of the server-to-client sending terminal 109 and the client-to-server sending terminal 110 depending on its destination address. In other words, the repeater 1 plays a role as an ordinary repeater.

In the case of a packet using a port number for conventional streaming transmission, it has not been registered in the flow registration table 104 but it is a streaming packet. Accordingly, it is forwarded to the header analyzer 102. In the case of a packet conforming to the streaming transmission control protocol, the contents of the packet is analyzed and registered in the flow registration table 104 and then is forwarded to a selected one of the server-to-client sending terminal 109 and the client-to-server sending terminal 110 depending on its destination address.

When receiving a feedback information packet indicating the reception condition of the client device 3, the packet analyzer 101 forwards it to the header analyzer 102 and the reception condition information is output to the packet manager 105.

When receiving a streaming packet, the header analyzer 102 analyzes the header of the received streaming packet to extract a sequential number of the relevant flow and a time stamp indicating a time instant of the server device 2 sending it. The address, port number, time stamp, and sequential number for the received streaming packet are output to the packet manager 105 and the streaming packet is output to the packet memory 103. In many instances, the header format employs RTP (Real-time transport protocol RFC 1889) as shown in FIG. 4.

The packet manager 105 registers the information of address, port number, time stamp, and sequential number for each flow identified by a pair of address and port number, into the flow registration table 104. An example of the flow registration table 104 is shown in FIG. 5.

Some streaming delivery application does not employ the RTP or cannot analyze it. In this case, the header analyzer 102 cannot obtain the above information. Accordingly, the header analyzer 102 notifies the packet manager 105 that necessary information cannot be obtained from this packet and forwards it to the packet memory 103.

The packet memory 103 buffers streaming packets input from the header analyzer 102 for each flow under the sending control of the packet sending controller 106. This buffering absorbs packet delay variations due to transmission from the server device 2 to the repeater 1 through the network.

Scheduling of Packet Sending Time

The packet manager 105 performs the scheduling of time of issuing a packet sending instruction for each flow to the packet sending controller 106 by referring to the packet registration table 104.

In a certain flow, the first-arrival packet is scheduled to be sent at the time set by adding a predetermined time period to its arrival time. The set time may be stored in a next sending time field of the flow registration table 104 (see FIG. 5). When the set time has come, the packet manager 105 issues a packet sending instruction for that flow to the packet sending controller 106. The second or later packet is scheduled to be sent at the time set by adding a sending time difference to the set time of the previous packet. The sending time difference is calculated from a difference between the time stamp of the second or later packet and the time stamp of the previous packet.

When the time interval of packets received from the server device 2 is always constant, the second or later packet may be scheduled to be sent at the time set by adding the constant time interval to the set time of the previous packet. The constant time interval is calculated from a difference between the time stamp of the second packet and the time stamp of the first packet.

In the case where information related to sending time cannot be extracted from a received packet, the playing rate informed from the client device 3 or an average reception rate of packets that have been received so far in the relevant flow can be used to determine the sending time interval for scheduling.

Feedback Control of Packet Sending Time

When receiving a feedback information packet indicating the reception condition of the client device 3, the packet analyzer 101 forwards it to the header analyzer 102 and the reception condition information is output to the packet manager 105. The packet manager 105 can adjust the packet sending time interval depending on the reception condition of the client device 3.

For example, when a variation in the arrival time interval of packets in a certain flow becomes greater, the packet manager 105 temporarily makes the packet sending time interval longer to absorb a greater delay variation in packet delivery. Contrarily, when a variation in the arrival time interval of packets in a certain flow becomes smaller, the packet manager 105 temporarily makes the packet sending time interval shorter to reduce the buffering time at the repeater 1. This reduces absolute delay time occurring between the server device 2 and the client device 3.

The delay variation reduction by the repeater 1 buffering packets causes the absolute delay occurring between the server device 2 and the client device 3 to be increased. However, the control of delay variation by the repeater 1 using the feedback information from the client device 3 suppresses the absolute delay occurring between the server device 2 and the client device 3.

When receiving a packet sending instruction for a certain flow from the packet manager 105, the packet sending controller 106 reads a head packet of a queue for the relevant flow from the packet memory 103 and forwards it to the server-to-client signal sending terminal 109. A packet to be sent has the source address and port number of the packet originating device (here, the server device 2) included in its header, not those of the repeater 1. Accordingly, for the client device 3, the packet appears received directly from the server device 2.

When the client device 3 receives a streaming packet from the server device 2 through the repeater 1, the streaming packet is forwarded to the application 32 through the communication terminal 33 (see FIG. 3B). After buffering the streaming packet to absorb delay variations in packet transmission, the application 32 plays the content based on the streaming packet.

As described before, in the application 32 performing packet reception and play, the amount of available buffer capacity varies depending on a difference between playing rate and reception rate. The reception condition notifying section 31 produces a reception condition indicating the amount of available capacity of the buffer provided in the application 32 and a packet reception rate and sends the reception condition notification packet carrying the reception condition as feedback information to the repeater 1 through the communication terminal 33. At the repeater 1, the reception condition is used to adjust the buffering time of the buffer to allow adaptive delay variation absorption, suppressing the absolute delay occurring between the server device 2 and the client device 3.

The invention claimed is:

1. A computer system for transferring streaming data in packets from a first computer to a second computer through a network, comprising:
a repeater provided in the network, the repeater comprising a buffering controller for buffering a received packet for a set time period before forwarding it so that a receiving time interval of packets at the second computer is substantially equal to a sending time interval of packets at the first computer, wherein the set time period is adjusted based on either of reception condition information of the second computer and time stamp information of received packets so as to absorb delay variations.

2. The computer system according to claim 1, wherein the set time period is determined depending on a reception condition of the second computer, wherein the second computer notifies the repeater of the reception condition.

3. The computer system according to claim 2, wherein the second computer has a buffering function of buffering received packets to absorb delay variations of the received packets.

4. The computer system according to claim 3, wherein the reception condition includes information of an available buffering capacity in the second computer.

5. The computer system according to claim 1, wherein the set time period is determined based on a difference between a time stamp of the received packet and a time stamp of a previously received packet.

6. The computer system according to claim 1, wherein the set time period is determined based on a playing rate of the streaming data, wherein the second computer notifies the repeater of the playing rate thereof.

7. The computer system according to claim 1, wherein the set time period is determined based on an average reception rate of packets received from the first computer at the repeater.

8. A method for transferring streaming data in packets from a first computer to a second computer through a network, comprising the steps of: the first computer sending a streaming packet to a repeater; the repeater buffering the streaming packet for a set time period before forwarding it to the second computer so that a receiving time interval of packets at the second computer is substantially equal to a sending time interval of packets at the first computer; and the second computer buffering the streaming packet received from the repeater before reproducing it, wherein the set time period is adjusted based on either of reception condition information of the second computer and time stamp information of received packets so as to absorb delay variations.

9. The method according to claim 8, wherein the set time period is adjusted depending on a reception condition of the second computer.

* * * * *